J. BARNHILL.
Seed-Planter.
No. 8,116.
Patented May 27, 1851.
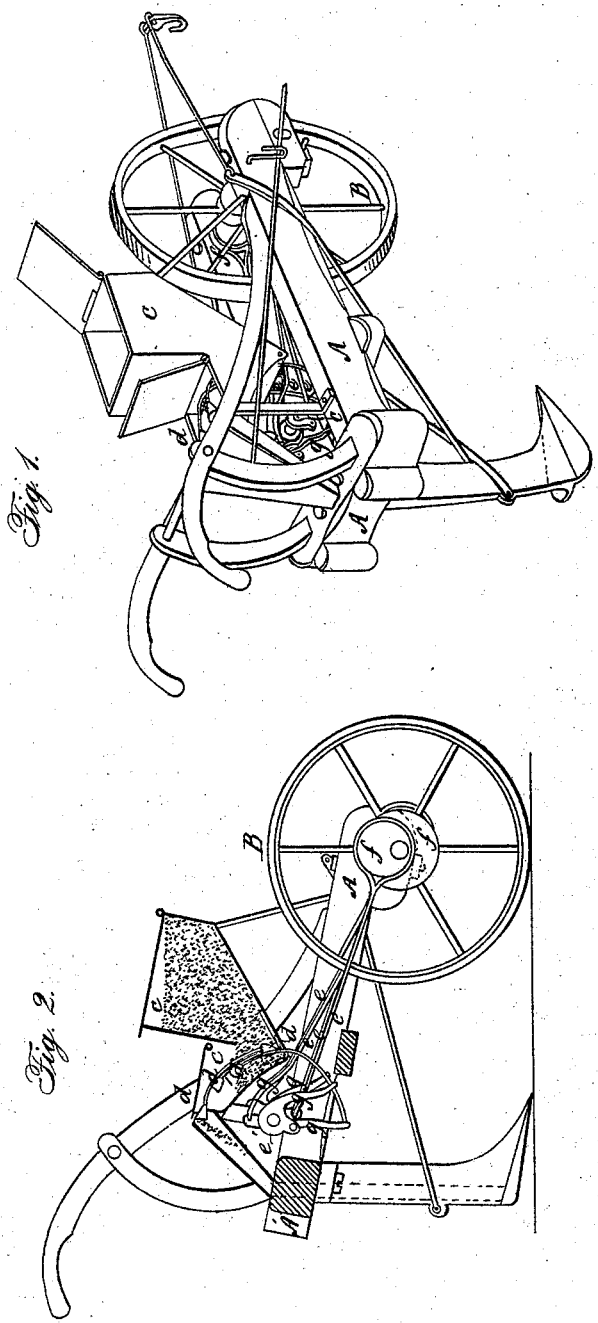

UNITED STATES PATENT OFFICE.

J. BARNHILL, OF CIRCLEVILLE, OHIO.

IMPROVEMENT IN SEED-PLANTERS.

Specification forming part of Letters Patent No. 8,116, dated May 27, 1851.

*To all whom it may concern:*

Be it known that I, JACOB BARNHILL, of Circleville, in the county of Pickaway and State of Ohio, have invented certain new and useful Improvements in Seed-Drills for Planting Corn and other Grains; and I do hereby declare that the following is a full, clear, and exact description thereof, reference being had to the accompanying drawings and letters marked thereon, forming a part of this specification.

The nature of my invention consists in the mode by which the seed are made to issue from the lower box and are discharged. This is accomplished by means of a series of four or more conical cups attached to segmental rods working through leather in the bottom of the box, and extending from levers upon a horizontal shaft under the seed-box. These cups are made of any capacity corresponding with the quantity or kind of seed to be sown, and are alternately raised and lowered in the inside of the lower box by means of levers operated upon by eccentrics and rods, hereinafter more fully described.

In the accompanying drawings, Figure 1 is a perspective view, and Fig. 2 a side elevation with the side of the frame and box removed to show more clearly the form of the box and the manner in which the cups are operated.

In each of these figures where the same parts are shown they are designated by the same letters of reference.

A A is the carriage-frame, which is supported at its front end by a wheel, B, and provided with handles at its rear end for guiding, resembling thus far a harrow or cultivator; C, the double box for containing the seed. These boxes are connected with each other at the bottom; but one part is higher than the other and capable of holding a larger quantity of seed, so that as fast as the seed are removed by the conical cups a corresponding quantity will descend and keep the seed in the lower compartment or box at always the same level. These boxes, both the upper and lower, are provided with covers $d\ d\ d\ d$, the four conical cups, which are made in capacity corresponding with the quantity of seed desired to be dropped, and a machine may be provided with sets of different sizes, which can be attached and detached for different kinds of seed. These cups are attached to segmental rods working through leather in the bottom of the box, and connected with double levers $g\ g\ g$, working on a horizontal shaft, $e$, so that they are alternately raised and lowered for raising and discharging seed by the connecting or cam rods $e\ e\ e\ e$, which are reciprocated by the two eccentrics $f\ f$ on each end of the shaft of the main wheel B. These connecting-rods operate upon the double levers or cams $g\ g\ g$, to which the conical cups are attached, thus raising and lowering the conical cups alternately, the operation of which will be perfectly obvious by reference to the accompanying drawings.

The drill is attached to the rear end of the frame and formed in the usual manner, except the share of the plough, which is flatter than usual upon its surface, the intention of which is that it shall not throw out a furrow, but allow the dirt to fall and close in behind the plow, so as to cover the seed, thereby dispensing with the necessity of any scrapers or shovels for refilling the drill or furrow. The plow is also on its under side slightly concave, so as to prevent the dirt in the furrow from closing up the holes or seed-tube, and thus preventing the free discharge of seed into the furrow.

Having thus fully described the nature, construction, and operation of my seed-drill, what I claim therein as new, and desire to secure by Letters Patent, is—

The conical cups attached to segmental rods extending from levers working on a horizontal shaft raised and lowered by the eccentrics and rods, substantially as described, operating in the manner and for the purpose herein fully set forth and represented.

In testimony whereof I have hereunto signed my name before two subscribing witnesses.

JACOB BARNHILL.

Witnesses:
  A. J. HASWELL,
  SAML. JONES.